Sept. 3, 1968           K. KUSCHEL           3,400,316
CIRCUIT ARRANGEMENT FOR PROVIDING PULSES IN DETERMINED
PHASE RELATION TO EACH OTHER Filed Aug. 10, 1965           3 Sheets-Sheet 1

INVENTOR
Konrad Kuschel
BY
Michael S. Striker
Attorney

INVENTOR.
Konrad Kuschel
BY Michael S. Striker
Attorney

Sept. 3, 1968  K. KUSCHEL  3,400,316
CIRCUIT ARRANGEMENT FOR PROVIDING PULSES IN DETERMINED
PHASE RELATION TO EACH OTHER
Filed Aug. 10, 1965  3 Sheets-Sheet 3

INVENTOR.
Konrad Kuschel
BY
Michael S. Striker
Attorney

United States Patent Office 3,400,316
Patented Sept. 3, 1968

3,400,316
CIRCUIT ARRANGEMENT FOR PROVIDING PULSES IN DETERMINED PHASE RELATION TO EACH OTHER
Konrad Kuschel, Vienna, Austria, assignor to IFE-Gesellschaft für Maschinen- und Apparatebau Dipl. Ing. Sagl & Co., Vienna, Austria
Filed Aug. 10, 1965, Ser. No. 478,611
Claims priority, application Austria, Aug. 11, 1964, A 6,895
9 Claims. (Cl. 318—114)

ABSTRACT OF THE DISCLOSURE

A circuit arrangement for generating pulses to be applied to the electromagnets of a vibrator. The pulses are generated so that they are of a predetermined phase relationship to each other. A square wave pulse generator connected to a source of alternating current produces square wave pulses in synchronism with the frequency of the alternating current. A phase shifting arrangement connected to the square wave pulse generator shifts the phase of the pulses generated with respect to the alternating current. The frequency of the resulting square wave pulses is divided down by a frequency dividing arrangement having two outputs each transmitting pulses displaced in phase from the other output. Control rectifiers are connected to each one of the outputs of the frequency dividing arrangement. The signals derived from the control rectifiers are then applied to the electromagnets of the vibrator.

---

The present invention relates to a circuit arrangement for providing pulses in determined phase relation to each other. More particularly, the invention relates to a circuit arrangement for providing pulses in determined phase relation to each other for controlling the energization of the electromagnets of a vibrator.

Vibrators are utilized in modern production equipment for transporting and shifting materials and for performing various operations on various materials. Vibrators driven by electromagnets are widely used, since the amplitude of the vibrations may be varied with great facility and may be continuously varied. An electromagnetic vibrator may comprise two masses coupled to each other by a spring system and an electromagnetic motor. One mass, called the usable mass, consists primarily of the operating part such as, for example, a chute, tube, conveyor, sieve or the like and the armature of the electromagnetic motor. The other mass which is the opposing mass consists primarily of the opposing mass and the electromagnet of the electromagnetic motor. The electromagnet or electromagnets of the electromagnetic motor is energized by an alternating current source.

In an electromagnetic vibrator, the amplitude of the vibration may be varied by varying the characteristics of the current for energizing the electromagnets. An electromagnetic vibrator may utilize two electromagnets operating in push-pull relation to each other and energized by currents which are shifted in phase relative to each other half the period of the mechanical vibration.

The principal object of the present invention is to provide a new and improved circuit arrangement for providing pulses in determined phase relation to each other.

An object of the present invention is to provide a new and improved circuit arrangement for providing pulses in determined phase relation to each other for controlling the energization of the electromagnets of a vibrator.

Another object of the present invention is to provide a new and improved circuit arrangement for providing pulses in determined phase relation to each other for controlling the energization of the electromagnets of a vibrator thereby controlling the amplitude of the vibrations of said vibrator.

In accordance with the present invention, a circuit arrangement for providing pulses in determined phase relation to each other comprises a source of alternating current for producing an alternating voltage having a determined frequency. A pulse generator has an input connected to the source of alternating current and an output for producing pulses in synchronism with the alternating current source at the determined frequency. A phase shifter is connected to the pulse generator for shifting the phase position of the pulses relative to the alternating current source. A frequency divider, which preferably comprises one or a plurality of bistable multivibrators, has an input connected to the output of the pulse generator and a pair of outputs. The frequency divider provides pulses having a frequency $f/2^n$ wherein $f$ is the determined frequency and $n$ is a whole number. The pulses provided at one of the outputs of the frequency divider are positioned in time relative to the pulses provided at the other of the outputs thereof by $2^{n-1}/f$. A first transformer couples the control electrode of a first controlled rectifier to one of the outputs of the frequency divider to control the ignition of the first controlled rectifier. A second transformer couples the control electrode of a second controlled rectifier to the other of the outputs of the frequency divider to control the ignition of the second controlled rectifier.

The circuit arrangement of the present invention may be utilized with a vibrator comprising a vibrating structure and first and second electromagnets spaced from each other and each having an energizing winding. The first and second electromagnets are positioned on both sides of and in operative proximity with the vibrating structure and operate in push-pull relation to vibrate the vibrating structure. In such application, the first controlled rectifier has, in addition to its control electrode, an input electrode connected to the source of alternating current and an output electrode connected to the energizing winding of the first electromagnet and the second controlled rectifier has, in addition to its control electrode, an input electrode connected to the source of alternating current and an output electrode connected to the energizing winding of the second electromagnet. The energization of the first and second electromagnets is thus accomplished by the control of the ignition of the first and second controlled rectifiers.

In order that the present invention may be readily carried into effect, it will now be described with reference to the accompanying drawings, wherein.

In the figures, the same components are identified by the same reference numerals.

If an electromagnet for driving a vibrator is energized by an alternating current source, said electromagnet produces vibrations at twice the frequency of the alternating current source. If a rectifier is utilized between the alternating current source and the electromagnet, said electromagnet produces vibrations equal in frequency to the alternating current source. Electromagnetically driven vibrators thus vibrate advantageously at frequencies equal to or twice the frequency of the alternating current source.

Aside from the leakage of the magnetic flux in the air gap, the attractive force of the magnet is proportional to the square of the magnetic flux at each time instant. The variation of the magnetic flux $\phi$ between two instants of time is directly proportional to the voltage-time area of the energizing coil of the electromagnet and is inversely proportional to the number of coil windings. Thus, $$\phi_2 - \phi_1 = \frac{1}{N} \int_1^2 u\, dt$$

where $\phi_2$ is the magnetic flux at time instant 2, $\phi_1$ is the magnetic flux at time instant 1, N is the number of coil windings and $u$ is the voltage on the energizing coil of the electromagnet. Since the control of the voltage-time area on the energizing coil permits control of the magnetic flux, it also permits control of the attractive force exerted by the magnet and thereby permits control of the amplitude of vibration produced by said magnet.

Figure 1:
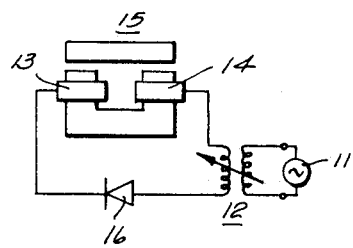
FIG. 1 is a circuit diagram of an embodiment of a diode rectifier controlled electromagnet.
Figure 2:
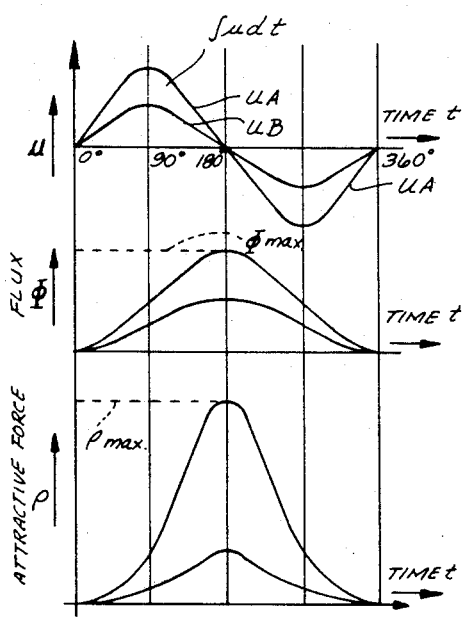
FIG. 2 is a series of graphical presentations illustrating the voltage, flux and attractive force of the electromagnet of FIG. 1.

FIGS. 1 to 4 illustrate circuits for the control of current in the energizing coils of an electromagnet by utilization of a diode rectifier and by utilization of a controlled rectifier and the effect on the flux and attractive force of the electromagnet. FIG. 1 shows a diode rectifier controlled electromagnet and FIG. 2 illustrates the current, flux and attractive force of the electromagnet of FIG. 1.

In FIG. 1, a source of alternating current 11 supplies an alternating voltage $u$ which is varied in magnitude by variable transformer 12 so that it may assume the waveshape $uA$ or the waveshape $uB$, for example, as shown in FIG. 2. Coils 13 and 14 of an electromagnet 15 are connected to the secondary winding of the transformer 12 via a diode rectifier 16. FIG. 2 illustrate time $t$ as abscissa in each instance and voltage $u$ as ordinate, flux $\phi$ as ordinate and attractive force P as ordinate.

Figure 3:
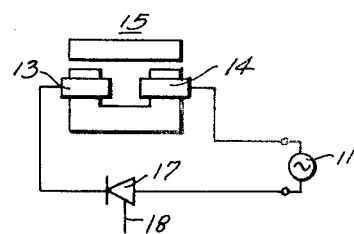
FIG. 3 is a circuit diagram of an embodiment of a controlled rectifier controlled electromagnet.

In FIG. 3, the source of alternating current 11 supplies the alternating voltage $u$ and the coils 13 and 14 of the electromagnet 15 are connected to the alternating current source 11 via a controlled rectifier 17. The controlled rectifier 17 may comprise any suitable controlled rectifier having an input electrode or anode connected to a terminal of the alternating current source 11, an output electrode or cathode connected to the energizing coil or winding 13 and a control electrode or gate 18 which controls the ignition of the rectifier. A suitable controlled rectifier may comprise, for example, a semiconductor controlled rectifier such as, for example, a silicon controlled rectifier.

Figure 4:
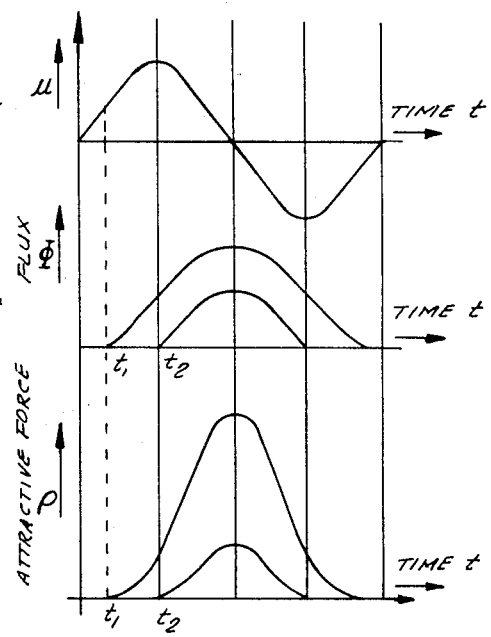
FIG. 4 is a series of graphical presentations illustrating the voltage, flux and attractive force of the electromagnet of FIG. 3.

FIG. 4 illustrates time $t$ as abscissa in each instance and voltage $u$ as ordinate, flux $\phi$ as ordinate and attractive force P as ordinate. The flux $\phi$ and thus the attractive force P is shown to depend upon the ignition time of the controlled rectifier 17 which ignition time is controlled by the pulses supplied to the control electrode 18 thereof in the usual manner of controlled rectifiers. The ignition of the controlled rectifier 17 and therefore the flux $\phi$ and the attractive force P is illustrated at two different phase positions $t_1$ and $t_2$ of the pulses.

In some instances, it is advantageous to provide vibrations at a frequency lower than the frequency of the alternating current source. In accordance with the present invention, as illustrated hereinafter, a pulse generator produces a series of pulses in synchronism with the alternating current source at the determined frequency of said alternating current. The pulses produced by the pulse generator are shiftable in phase position relative to the alternating current source. The pulses produced by the pulse generator control a frequency divider which provides pulses at two outputs at a frequency $f/2^n$, the pulses at one output being positioned in time at $2^{n-1}/f$ relative to the pulses at the other output. In these relationships, $f$ is the frequency of the alternating current source and $n$ is a positive whole number. The pulses provided by the frequency divider are supplied by means of coupling transformers to the control electrodes of controlled rectifiers connected in the energization circuits of electromagnet energizing windings and thus control the ignition of the controlled rectifiers and the energization of the electromagnets.

The circuit arrangement of the present invention for providing pulses in determined phase relation to each other may thus function to control an electromagnetic driven vibrator at a vibration frequency equal to $\frac{1}{2}^n$ times the frequency of the alternating current source. The drive magnets may be in push-pull relation or a single drive magnet may be utilized.

Figure 5:
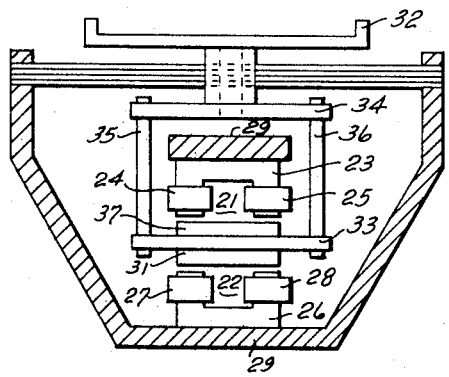
FIG. 5 is a view partly in section, of an embodiment of an electromagnetically driven vibrator.

FIG. 5 is an embodiment of a vibrator driven by a pair of electromagnets in push-pull relation to each other. The vibrator of FIG. 5 utilizes a first electromagnet 21 in push-pull relation to a second electromagnet 22. The first electromagnet 21 comprises a core 23 and energizing windings or coils 24 and 25 and the second electromagnet 22 comprises a core 26 and energizing windings or coils 27 and 28. The cores 23 and 26 of the first and second electromagnets, respectively, are affixed to the opposing mass 29 of the vibrator.

Magnetizable armatures 31 and 37 are affixed or coupled to the operating part 32 of the vibrator by any suitable coupling means such as, for example, a bar or plate 33 affixed to the yoke 31, a bar or plate 34 affixed to the operating part 32 and fastening pins, bolts or the like 35 and 36 coupling the plates 33 and 34 to each other.

Figure 6:
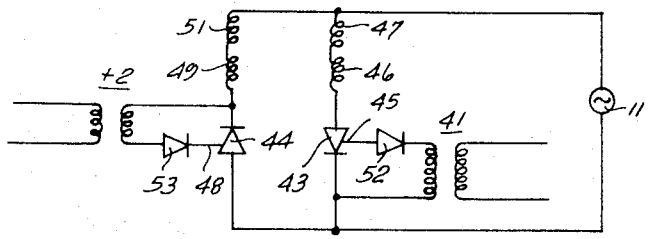
FIG. 6 is a circuit diagram of an embodiment of an electromagnet energization circuit which may utilize the circuit arrangement of the present invention.

FIG. 6 is a circuit diagram of an embodiment of an electromagnet energization circuit which may utilize the circuit arrangement of the present invention. FIG. 6 shows part of the circuit arrangement of the present invention comprising first and second coupling transformers 41 and 42 and first and second controlled rectifiers 43 and 44. The first coupling transformer 41 has a secondary winding connected between the control electrode 45 and the cathode thereof. The first coupling transformer 41 thus controls the ignition of the first controlled rectifier 43 by supplying ignition pulses to the control electrode 45 and thereby controls the energization of the first electromagnet, the energization windings 46 and 47 of which are connected in series with the first controlled rectifier 43 across the source 11 of alternating current.

The second coupling transformer 42 has a secondary winding connected between the control electrode 48 and the cathode thereof. The second coupling transformer 42 thus controls the ignition of the second controlled rectifier 44 by supplying ignition of the second controlled rectifier 44 by supplying ignition pulses to the control electrode 48 and thereby controls the energization of the second electromagnet, the energization windings 49 and 51 of which are connected in series with the second controlled rectifier 44 across the source 11 of alternating current. A diode 52 is connected between the secondary winding of the first coupling transformer 41 and the control electrode 45 of the first controlled rectifier 43 and suppresses negative pulses. A diode 53 is connected between the secondary winding of the second coupling transformer 42 and the control electrode 48 of the second controlled rectifier 44 and suppresses negative pulses.

Figure 8:
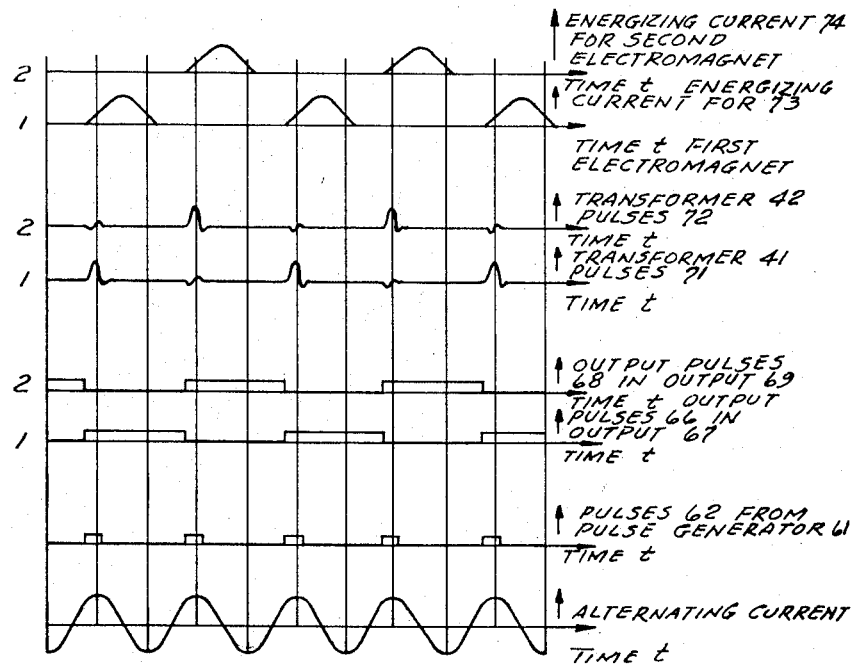
FIG. 8 is a graphical presentation illustrating the wave forms present in the circuit arrangement of FIG. 7.
Figure 7:
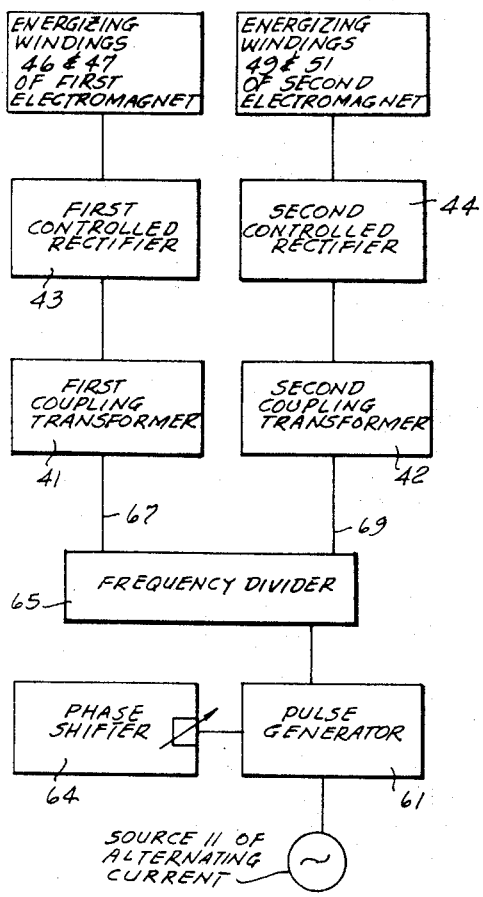
FIG. 7 is a block diagram of an embodiment of the pulse providing circuit arrangement of the present invention utilized to control the energization of the electromagnets of a vibrator.
Figure 9:
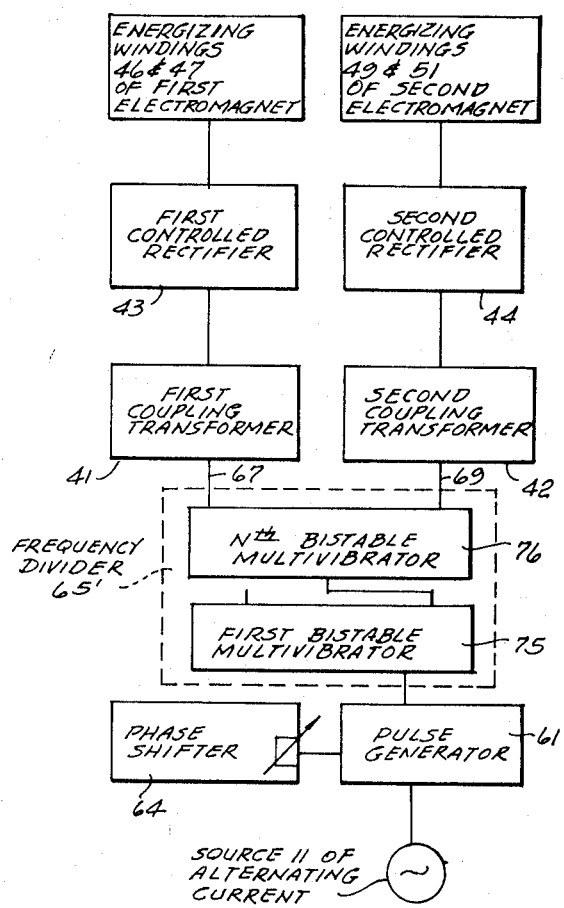
FIG. 9 is a block diagram of a modification of the pulse providing circuit arrangement of the embodiment of FIG. 7.

FIG. 7 is a block diagram of an embodiment of the circuit arrangement of the present invention for providing pulses in determined phase relation to each other utilized to control the energization of the electromagnets of a vibrator. FIG. 8 illustrates the waveforms present in the circuit arrangement of FIG. 7. FIG. 9 is a modification of the embodiment of FIG. 7. In FIGS. 7 and 9 a pulse generator 61 produces squarewave pulses, shown as pulses 62 in FIG. 8, in synchronism with the alternating current source 11 at the frequency of the alternating current produced by said alternating current source, shown as waveform 63 in FIG. 8. The input of the pulse generator 61 is connected to the alternating current source 11 and the pulses 62 are provided at the output of said pulse generator. The frequency of the alternating current source 63 and the frequency of the pulses 62 are the same and are designated $f$.

A phase shifter 64 is connected to the pulse generator 61 for shifting the phase position of the pulses 62 relative to the alternating current. The pulses 62 are supplied via the output of the pulse generator 61 to the input of a frequency divider 65. The pulses 62 may thus be shifted in phase by the phase shifter 64 to control the flux and attractive forces of the first and second electromagnets in the manner hereinafter described. The frequency divider 65 preferably comprises a bistable multivibrator or flip flop having two outputs. A series of pulses 66 (FIG. 8) having a frequency $f/2^n$, where $n$ is a positive whole number, is provided at the first output 67 of the frequency divider 65. A series of pulses 68 (FIG. 8) having a frequency $f/2^n$ is provided at the second output 69 of the frequency divider 65.

The pulses 66 in the first output 67 and the pulses 68 in the second output 69 are positioned in time relative to each other by $2^{n-1}/f$. The leading edge of each pulse of the series of pulses 66 and 68 coincides in time with the leading edge of each of the pulses 62. The duration of each pulse of the series of pulses 66 and 68 is equal to the period of the alternating current source 63. The frequency of the pulses of the series of pulses 66 and 68 is half the frequency $f$.

The first output 67 of the frequency divider 65 is connected to the primary winding of the first coupling transformer 41. One terminal of the secondary winding of the first coupling transformer 41 is connected to the control electrode 45 (FIG. 6) of the first controlled rectifier 43 and the other terminal of said secondary winding is connected to the cathode of said controlled rectifier, so that the pulses 66 in the first output 67 control the ignition of said first controlled rectifier and thereby control the energization of the first electromagnet, the energizing windings 46 and 47 of which are connected to the anode of said first controlled rectifier (FIG. 6).

The second output 69 of the frequency divider 65 is connected to the primary winding of the second coupling transformer 42. One terminal of the secondary winding of the second coupling transformer 42 is connected to the control electrode 48 (FIG. 6) of the second controlled rectifier 44 and the other terminal of said secondary winding is connected to the cathode of said controlled rectifier, so that the pulses 68 in the second ouput 69 control the ignition of said second controlled rectifier and thereby control the energization of the second electromagnet, the energizing windings 49 and 51 of which are connected to the cathode of said second controlled rectifier (FIG. 6).

The diodes 52 and 53 may be utilized in the manner described with reference to FIG. 6. The pulses 71 (FIG. 8) are provided at the secondary winding of the first coupling transformer 41 and the pulses 72 (FIG. 8) are provided at the secondary winding of the second coupling transformer 42. The energizing current 73 (FIG. 8) is provided by the circuit arrangement of the present invention for the energizing windings 46 and 47 of the first electromagnet as a result of the control of the ignition of the first controlled rectifier 43 by said circuit arrangement. The energizing current 74 (FIG. 8) is provided by the circuit arrangement of the present invention for the energizing windings 49 and 51 of the second electromagnet as a result of the control of the ignition of the second controlled rectifier 44 by said circuit arrangement.

The pulse generator 61 may comprise any suitable square wave pulse generator known in the art. The phase shifter 64 may comprise any suitable phase shifter known in the art. The frequency divider 65 may comprise any suitable frequency divider known in the art, such as, for example, a bistable multivibrator or flip flop, which may comprise any suitable known circuitry operating in a suitable known manner. The controlled rectifiers 43 and 44 may comprise any suitable controlled rectifiers such as, for example, semiconductor controlled rectifiers such as, for example, silicon controlled rectifiers.

In the modification of FIG. 9, the frequency divider 65′ comprises a plurality of bistable multivibrators, each having an input and a pair of outputs, connected in tandem arrangement with one of the outputs of each of said multivibrators connected to the input of the next succeeding one thereof. The pair of outputs 67 and 69 of the frequency divider 65′ is then the pair of outputs of the $n$th bistable multivibrator 76 and the input of said frequency divider is the input of the first bistable multivibrator 75. If $n$ equals 2, so that only two bistable multivibrators are utilized, each pulse of each series of output pulses in the outputs 67 and 69 has a pulse duration equal to twice the period of the alternating current, and the pulses of each said series of pulses are positioned in time relative to each other by one half the period of the individual pulses or twice the period of the alternating current.

Since $n$ is a positive whole number, any suitable number of bistable multivibrators may be connected in tandem as the frequency divider 65′. Thus, the duration of the pulses provided by the frequency divider 65′ varies in the ratio $1:2^n$ relative to the frequency $f$ of the alternating current 63.

The frequency of vibration of a vibrator driven by electromagnets whose energization is controlled by the circuit arrangement of the present invention is $f/2^n$. The positive whole number $n$ is the number of bistable multivibrators in the frequency divider, $n$ representing the same number through the present disclosure.

The vibrator may comprise a single electromagnet rather than two or more electromagnets. In such case, a single controlled rectifier is connected via its input electrode to the source of alternating current and with its output connected to the energizing winding of the electromagnet. A single coupling transformer is connected to couple the control electrode of the controlled rectifier to one of the outputs of the frequency divider to control the ignition of the controlled rectifier thereby controlling the energization of the electromagnet.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim is:

1. A circuit arrangement for providing pulses in determined phase relation to each other, comprising a source of alternating current for producing an alternating current having a determined frequency; a square wave pulse generator having an input connected to said source of alternating current and an output for producing square wave pulses in synchronism with said alternating current at said determined frequency; phase shifting means connected to said pulse generator for shifting the phase position of said pulses relative to said alternating current; frequency dividing means having an input connected to the output of said pulse generator and a pair of outputs for providing pulses having a frequency $f/2^n$ wherein $f$ is said determined frequency and $n$ is a positive whole number, the pulses provided at one of said outputs being positioned in time relative to the pulses provided at the other of said outputs by $2^{n-1}/f$; first and second controlled rectifier means each having a control electrode; first coupling means for coupling the control electrode of said first controlled rectifier means to one of the outputs of said frequency dividing means to control the ignition of said first controlled rectifier means; and second coupling means for coupling the control electrode of said second controlled rectifier means to the other of the outputs of said frequency dividing means to control the ignition of said second controlled rectifier means.

2. A circuit arrangement for providing pulses in determined phase relation to each other as claimed in claim 1, wherein said frequency dividing means comprises a bistable multivibrator.

3. A circuit arrangement for providing pulses in determined phase relation to each other as claimed in claim 1, wherein said frequency dividing means comprises a plurality of bistable multivibrators each having an input and a pair of outputs connected in tandem arrangement with one of the outputs of each of said bistable multivibrators connected to the input of the next succeeding one thereof, the pair of outputs of said frequency dividing means comprising the pair of outputs of the $n$th of said bistable multivibrators and the input of said frequency dividing means comprising the input of the first of said bistable multivibrators.

4. A circuit arrangement for providing pulses in determined phase relation to each other, comprising
   a source of alternating current for producing an alternating current having a determined frequency;
   a pulse generator having an input connected to said source of alternating current and an output for producing pulses in synchronism with said alternating current at said determined frequency;
   phase shifting means connected to said pulse generator for shifting the phase position of said pulses relative to said alternating current;
   frequency dividing means having an input connected to the output of said pulse generator and a pair of outputs for providing pulses having a frequency $f/2^n$ wherein $f$ is said determined frequency and $n$ is a positive whole number, the pulses provided at one of said outputs being positioned in time relative to the pulses provided at the other of said outputs by $2^{n-1}/f$;
   vibrating means comprising a vibrating structure and first and second electromagnets spaced from each other and each having an energizing winding, said first and second electromagnets being positioned on both sides of and in operative proximity with said vibrating structure and operating in push-pull relation to vibrate said vibrating structure;
   first controlled rectifier means having an input electrode connected to said source of alternating current, an output electrode connected to the energizing winding of said first electromagnet and a control electrode;
   second controlled rectifier means having an input electrode connected to said source of alternating current, an output electrode connected to the energizing winding of said second electromagnet and a control electrode;
   first coupling means for coupling the control electrode of said first controlled rectifier means to one of the outputs of said frequency dividing means to control the ignition of said first controlled rectifier thereby controlling the energization of said first electromagnet; and
   second coupling means for coupling the control electrode of said second controlled rectifier means to the other of the outputs of said frequency dividing means to control the ignition of said second controlled rectifier thereby controlling the energization of said second electromagnet.

5. A circuit arrangement for providing pulses in determined phase relation to each other, comprising
   a source of alternating current for producing an alternating current having a determined frequency;
   a pulse generator having an input connected to said source of alternating current and an output for producing pulses in synchronism with said alternating current at said determined frequency;
   phase shifting means connected to said pulse generator for shifting the phase position of said pulses relative to said alternating current;
   frequency dividing means having an input connected to the output of said pulse generator and a pair of outputs for providing pulses having a frequency $f/2^n$ wherein $f$ is said determined frequency and $n$ is a positive whole number, the pulses provided at one of said outputs being positioned in time relative to the pulses provided at the other of said outputs by $2^{n-1}/f$;
   vibrating means comprising a vibrating structure and first and second electromagnets spaced from each other and each having an energizing winding, said first and second electromagnets being positioned on both sides of and in operative proximity with said vibrating structure and operating in push-pull relation to vibrate said vibrating structure;
   first controlled rectifier means having an anode connected to said source of alternating current, a cathode connected to the energizing winding of said first electromagnet and a control electrode;
   second controlled rectifier means having an anode connected to said source of alternating current, a cathode connected to the energizing winding of said second electromagnet and a control electrode;
   first coupling means for coupling the control electrode of said first controlled rectifier means to one of the outputs of said frequency dividing means to control the ignition of said first controlled rectifier thereby controlling the energization of said first electromagnet; and
   second coupling means for coupling the control electrode of said second controlled rectifier means to the other of the outputs of said frequency dividing means to control the ignition of said second controlled rectifier thereby controlling the energization of said second electromagnet.

6. A circuit arrangement for providing pulses in determined phase relation to each other as claimed in claim 5, wherein said pulse generator comprises a square wave pulse generator for producing square wave pulses, and wherein said frequency dividing means comprises bistable multivibrator means.

7. A circuit arrangement for providing pulses in determined phase relation to each other as claimed in claim 5, wherein each of said first and second coupling means comprises a transformer having a primary winding connected to the corresponding output of said frequency dividing means and a secondary winding connected to the control electrode of the corresponding controlled rectifier.

8. A circuit arrangement for providing pulses in determined phase relation to each other as claimed in claim 5, wherein said frequency dividing means comprises a plurality of bistable multivibrators each having an input and a pair of outputs connected in tandem arrangement with one of the outputs of each of said bistable multivibrators connected to the input of the next succeeding one thereof, the pair of outputs of said frequency dividing means comprising the pair of outputs of the $n$th of said bistable multivibrators and the input of said frequency dividing means comprising the input of the first of said bistable multivibrators.

9. A circuit arrangement for providing pulses in determined phase relation to each other, comprising
a source of alternating current for producing an alternating current having a determined frequency;
a pulse generator having an input connected to said source of alternating current and an output for producing pulses in synchronism with said alternating current at said determined frequency;
phase shifting means connected to said pulse generator for shifting the phase position of said pulses relative to said alternating current;
frequency dividing means having an input connected to the output of said pulse generator and a pair of outputs for providing pulses having a frequency $f/2^n$ wherein $f$ is said determined frequency and $n$ is a positive whole number, the pulses provided at one of said outputs being positioned in time relative to the pulses provided at the other of said outputs by $2^{n-1}/f$;
vibrating means comprising a vibrating structure and an electromagnet positioned in operative proximity with said vibrating structure and operating to vibrate said vibrating structure, said electromagnet having an energizing winding;
controlled rectifier means having an input electrode connected to said source of alternating current, an output electrode connected to the energizing winding of said electromagnet and a control electrode; and
coupling means for coupling the control electrode of said controlled rectifier means to one of the outputs of said frequency dividing means to control the ignition of said controlled rectifier thereby controlling the energization of said electromagnet.

References Cited

UNITED STATES PATENTS

| | | | |
|---|---|---|---|
| 2,901,289 | 8/1959 | Martin | 318—132 XR |
| 3,075,136 | 1/1963 | Jones | 307—88.5 XR |
| 3,147,419 | 9/1964 | Cope | 318—129 |
| 3,186,770 | 6/1965 | O'Neal | 318—132 XR |
| 3,219,969 | 11/1965 | Snavely | 318—128 XR |
| 3,226,627 | 12/1965 | Fromkin | 323—22 |

MILTON O. HIRSHFIELD, *Primary Examiner.*

D. F. DUGGAN, *Assistant Examiner.*